United States Patent
Mahadevappa et al.

(10) Patent No.: US 8,913,515 B2
(45) Date of Patent: Dec. 16, 2014

(54) MEASURING AND IMPROVING MULTIUSER DOWNLINK RECEPTION QUALITY IN WIRELESS LOCAL AREA NETWORKS

(75) Inventors: Ravishankar H. Mahadevappa, San Jose, CA (US); Thomas E. Pare, Jr., Mountain View, CA (US); Kiran Uln, Pleasanton, CA (US)

(73) Assignee: Mediatek Singapore Pte. Ltd., Singapore (SG)

(*) Notice: Subject to any disclaimer, the term of this patent is extended or adjusted under 35 U.S.C. 154(b) by 0 days.

(21) Appl. No.: 13/313,920

(22) Filed: Dec. 7, 2011

(65) Prior Publication Data

US 2012/0314594 A1 Dec. 13, 2012

Related U.S. Application Data

(60) Provisional application No. 61/423,583, filed on Dec. 15, 2010.

(51) Int. Cl.
  *G01R 31/08* (2006.01)
  *H04W 4/00* (2009.01)
  *H04W 24/10* (2009.01)
  *H04W 84/12* (2009.01)

(52) U.S. Cl.
  CPC .......... *H04W 24/10* (2013.01); *H04W 84/12* (2013.01)
  USPC .................................. 370/252; 370/329

(58) Field of Classification Search
  USPC .................................. 370/252, 329
  See application file for complete search history.

(56) References Cited

U.S. PATENT DOCUMENTS

| | | | |
|---|---|---|---|
| 8,036,298 B2* | 10/2011 | Kim et al. | 375/267 |
| 8,526,351 B2* | 9/2013 | Fischer et al. | 370/312 |
| 2008/0081655 A1* | 4/2008 | Shin et al. | 455/522 |
| 2009/0028112 A1* | 1/2009 | Attar et al. | 370/332 |
| 2009/0040970 A1* | 2/2009 | Ahmadi et al. | 370/329 |
| 2010/0002570 A9* | 1/2010 | Walton et al. | 370/208 |
| 2010/0182951 A1* | 7/2010 | Park et al. | 370/328 |
| 2010/0208608 A1* | 8/2010 | Wang | 370/252 |
| 2011/0274003 A1* | 11/2011 | Pare et al. | 370/252 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE Computer Society, IEEE Std 802.11n—2009, Oct. 29, 2009, 536 pages.

(Continued)

*Primary Examiner* — Mark Rinehart
*Assistant Examiner* — Angel Brockman
(74) *Attorney, Agent, or Firm* — Sawyer Law Group, P.C.

(57) ABSTRACT

Embodiments for improving multi-user downlink reception quality in WLANS are disclosed. In one embodiment, a method includes receiving, at a station, at least one multi-user sounding packet from an access point. The method also includes determining a sum of desired signal strengths from the at least one received sounding packet. The method also includes determining a sum of interference signal strengths from the at least one received sounding packet. The method also includes generating link quality metrics based on a ratio of the sum of desired signal strengths to the sum of interference signal strengths.

17 Claims, 4 Drawing Sheets

(56) References Cited

OTHER PUBLICATIONS

IEEE P802.11ac/D4.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, Prepared by the 802.11 Working Group of the 802 Committee, Oct. 2012, 458 pages.

* cited by examiner

MEASURING AND IMPROVING MULTIUSER
DOWNLINK RECEPTION QUALITY IN
WIRELESS LOCAL AREA NETWORKS

CROSS-REFERENCE TO RELATED APPLICATION

This application claims the benefit of U.S. Provisional Patent Application No. 61/423,583, filed on Dec. 15, 2010, entitled "METHOD OF QUALITY MEASUREMENT FOR MULTIUSER COMMUNICATIONS," which is incorporated herein by reference in its entirety.

FIELD OF THE INVENTION

The present invention relates generally to WLAN receivers, and more particularly to improving multi-user downlink reception quality in WLANs.

BACKGROUND

In orthogonal frequency-division multiplexing (OFDM) physical layer based communication systems, such as those based on 802.11 standards, some wireless local area network (WLAN) standards (e.g., 802.11ac) will provide support for simultaneous transmission of independent data streams to multiple receivers using multiple-input and multiple-output (MIMO) technology. Using MIMO technology, different data streams are embedded along different spatial directions in a single transmission, which is received and decoded by multiple receivers. A problem with such multi-user transmissions is interference, which reduces overall throughput in a network.

Accordingly, what is desired is a method and system for improving multi-user reception quality in a WLAN. The system and method should be easily implemented, cost effective, reliable, and should be adaptable to existing communications systems. Embodiments described herein address such a need.

SUMMARY

A method and system for improving multi-user downlink reception quality in WLANS are disclosed. In one aspect, a method includes receiving, at a station, at least one multi-user sounding packet from an access point. The method also includes determining a sum of desired signal strengths from the at least one received sounding packet. The method also includes determining a sum of interference signal strengths from the at least one received sounding packet. The method also includes generating link quality metrics based on a ratio of the sum of desired signal strengths to the sum of interference signal strengths.

DETAILED DESCRIPTION

The present invention relates generally to WLAN receivers, and more particularly to improving multi-user downlink reception quality in WLANS. The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Embodiments described herein improve multi-user downlink transmission quality in WLANs by measuring interference caused by data transmitted from an access point (AP) to different stations (STAs). In one embodiment, the AP transmits sounding packets to the different STAs, and each STA generates metrics that include channel information. For example, in one embodiment, each STA generates a set of metrics referred to as multi-user (MU) multiple-input and multiple-output (MIMO) link quality (MLQ) metrics, which provide a measure of the quality of a multi-user downlink transmission from the AP to STAs. In one embodiment, protocols and new frame formats are used to report the link quality metrics from each STA to the AP. In one embodiment, the AP uses the link quality metrics to form groups of STAs to which the AP can transmit packets simultaneously. The AP also uses the link quality metrics to generate steering vectors to be used for each group of STAs, where the steering vectors reduce interference during multi-user transmissions.

Embodiments described herein solve problems associated with interference mitigation in such multi-user transmissions, thus contribute to improvement of overall throughput in the network. To more particularly describe the features of the present invention, refer now to the following description in conjunction with the accompanying figures.

System Environment

Figure 1:
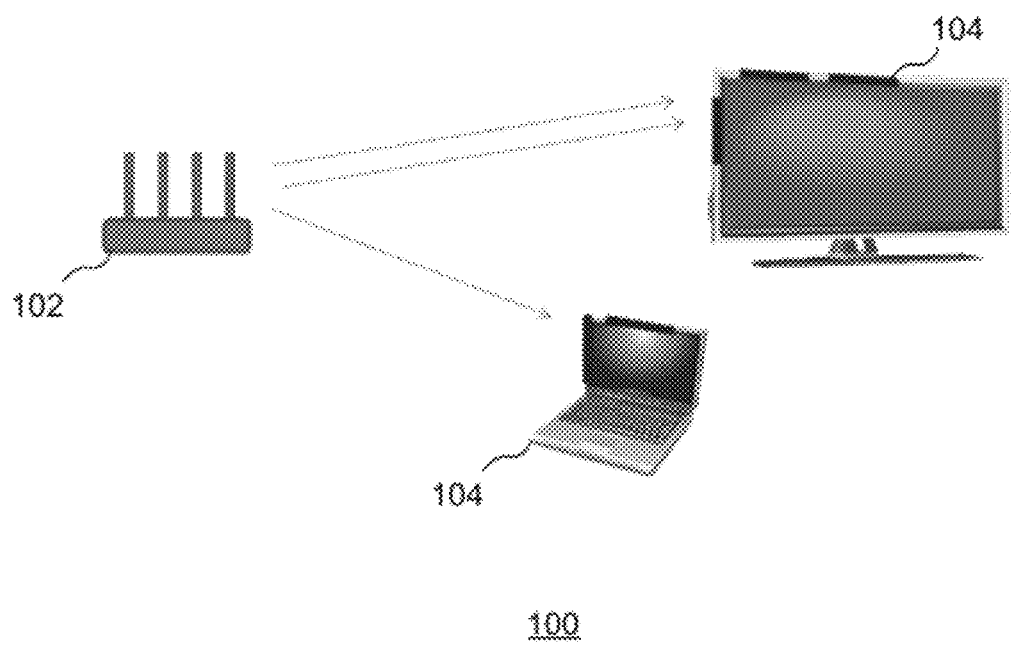
FIG. 1 is a block diagram of a wireless local area network (WLAN), which includes an access point (AP) and two stations (STAs) in accordance with an embodiment of the present invention.

FIG. 1 is a block diagram of a wireless local area network (WLAN) 100, which includes a transmission device such as an access point (AP) 102 and stations (STAs) 104 in accordance with the present invention. In one embodiment, the AP 102 may be a central wireless router. In various embodiments, the STAs 104 may include notebook computers, laptop computers, desktop computers, smart phones, etc.

Although FIG. 1 shows one AP 102 and two STAs 104, one of ordinary skill in the art will readily recognize that there could be any number of APs and any number of STAs, and such numbers would be within the spirit and scope of the present invention.

In various embodiments, the AP 102 maintains the WLAN 100 by associating and authenticating new WLAN devices such as STAs 104, and by coordinating transmissions based on time and bandwidth requests by the STAs 104. In one embodiment, the STAs 104 enhance network efficiency by enabling data transmission by the AP 102 to multiple STAs 104 simultaneously using advanced MIMO techniques.

In one embodiment, the AP 102 has $N_{TX,AP}$ transmit antennas, and each of the STAs 104 have $N_{RX,i}$ receive antennas. Further, $N_{STS}$ is the number of space-time streams that the AP 102 may transmit, and $N_{STS,i}$ is the number of space-time streams that each of the STAs (STA i) may be able to receive.

Transmission of Sounding Packets from an Access Point to Stations

Figure 2:
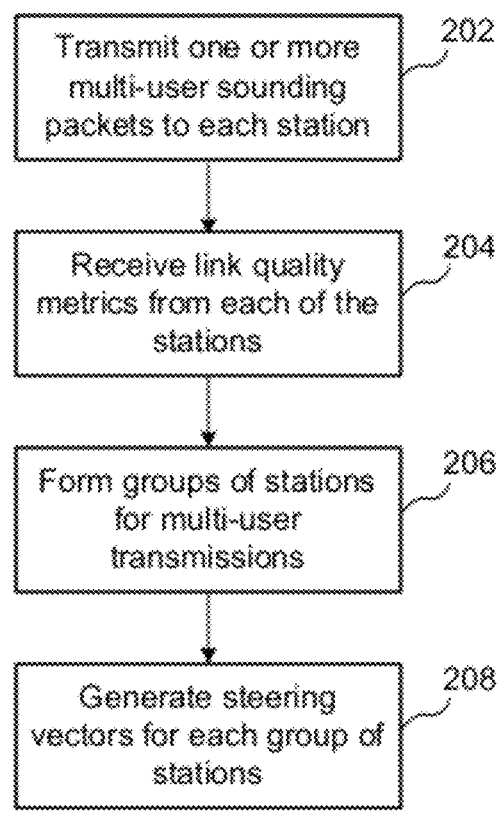
FIG. 2 is a flow chart which illustrates a method for improving multi-user downlink reception quality in WLANs in accordance with an embodiment of the present invention.

FIG. 2 is a flow chart which illustrates a method for improving multi-user downlink reception quality in WLANs in accordance with an embodiment of the present invention. Referring to FIGS. 1 and 2 together, first, the AP 102 transmits one or more multi-user sounding packets to each STA 104, via step 202. Although embodiments disclosed herein are described in the context of an AP transmitting multi-user sounding packets to STAs, the present invention may apply to any type transmission device, and still remain within the spirit and scope of the present invention. In various embodiments, IEEE standards (e.g., 802.11ac) provide support for simultaneous transmission of independent data streams to multiple receivers. Embodiments may be applied to orthogonal frequency-division multiplexing (OFDM) physical-layer based communication systems such as those based on 802.11 standards. Using MIMO technology, the AP 102 may embed different data streams along different spatial directions in a single transmission, which is received and decoded by multiple receivers at the STAs 104.

Next, the AP 102 receives link quality metrics from each of the STAs 104, via step 204. As described in more detail below in connection with FIG. 3, the link quality metrics are based on a ratio of a sum of desired signal strengths to a sum of interference signal strengths.

In one embodiment, the AP 102 forms groups of STAs for multi-user transmissions, via step 206. In various embodiments, the AP 102 may substantially simultaneously transmit packets to the groups of STAs 104. In one embodiment, the AP 102 also generates steering vectors to be used for each group of STAs, via step 208, where the steering vectors reduce interference during multi-user transmissions. In various embodiments, the AP 102 utilizes the received metrics to form the groups of STAs 104, and also utilizes the received link quality metrics to generate the steering vectors. Steps 206 and 208 may be performed in any order. For ease of illustration, steps 206 and 208 are described in more detail below after the description of the link quality metrics generated by the STAs 104.

Generation of Metrics by Stations

As indicated above, each STA 104 generates link quality metrics (also referred to as MLQ metrics), which provide a measure of the quality of a multi-user downlink transmission from the AP 102 to STAs 104.

Figure 3:
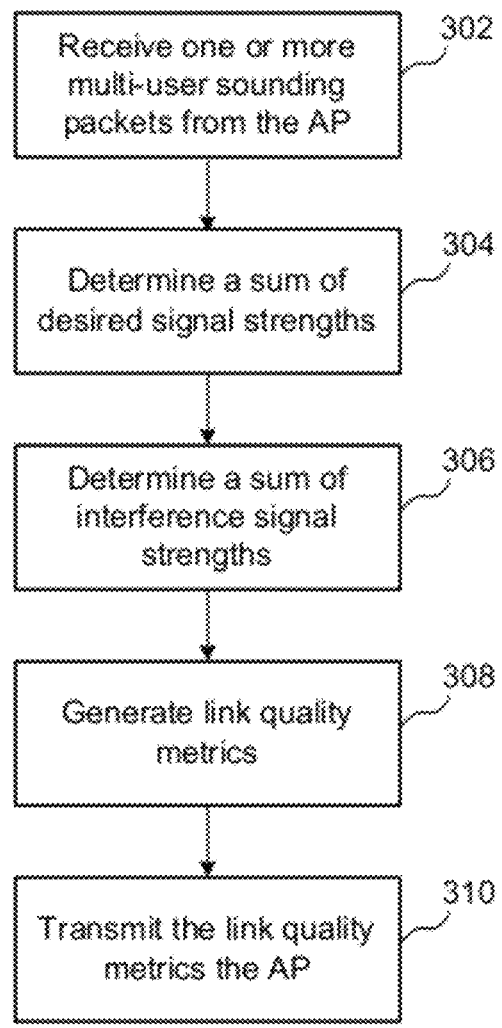
FIG. 3 is a flow chart which illustrates a method for generating link quality metrics for improving multi-user downlink reception quality in WLANs in accordance with an embodiment of the present invention.

FIG. 3 is a flow chart which illustrates a method for generating link quality metrics for improving multi-user downlink reception quality in WLANs in accordance with an embodiment of the present invention. Referring to FIGS. 1 and 3 together, first, an STA 104 receives one or more multi-user sounding packets from the AP 102, via step 302. Note that each STA 104 receives one or more multi-user sounding packets from the AP 102. For ease of illustration, one STA 104 is described in these examples, and embodiments described herein also apply to any one or more of the STAs 104.

In one embodiment, a given STA 104 (also referred to as STA i) receives a vector for a subcarrier k in a OFDM symbol according to the following equations:

$$y_{k,i} = \hat{H}_{k,i} x_k + w_{k,i}$$

$$\hat{H}_{k,i} \approx H_{k,i} Q_k$$

where
$Q_k = [Q_{k,1}\ Q_{k,2} \ldots Q_{k,N_u}]^T$
$x_k = [x_{k,1}\ x_{k,2} \ldots x_{k,N_u}]^T$ In one embodiment, $Q_k$ denotes a matrix consisting of steering vectors for a subcarrier k used by the AP 102 to transmit to a particular group of STAs 104.

In one embodiment, $y_{k,i}$ is the received signal at the STA 104, k is a subcarrier, $x_k$ is the transmitted signal, $w_{k,i}$ is noise, and $\hat{H}_{k,i}$ is a channel matrix. In one embodiment, $\hat{H}_{k,i}$ is of the order $N_{RX,i} \times N_{TX,AP}$ and the effective channel for a MU-MIMO transmission is $H_{k,i} Q_k$ which is of the order $N_{RX,i} \times N_{STS}$. In one embodiment, $N_{TX,AP}$ is the number of transmit (TX) antennas used at the AP 102, $N_{RX,i}$ is the number of receive (RX) antennas used at a STA 104.

In one embodiment, $Q_k$ is a steering vector matrix for all users (e.g., STAs) for subcarrier k, $x_k$ consists of transmit symbols for all spatial streams of all users, $x_{k,i}$ denotes the vector of symbols to be decoded by STA i, and $N_u$ denotes number of users (STAs) in the group.

Next, the STA 104 determines a sum of desired signal strengths from the one or more received sounding packets, via step 304. The STA 104 also determines a sum of interference signal strengths from the one or more received sounding packets, via step 306. Steps 304 and 306 may be performed in any order. Using these sums, the STA 104 generates link quality metrics based on a ratio of the sum of desired signal strengths to the sum of interference signal strengths, via step 308.

In one embodiment, to perform steps 304, 306, and 308, the STA 104 extracts effective channel estimates using very-high throughput long training field (VHT-LTF) symbols. In one embodiment, the estimates may be approximately equal to $H_{k,i} Q_k$, as various noise sources in the receiver and changes in the channel $H_{k,i}$ may lead to differences. Two embodiments for generating link quality metrics are described in more detail below.

First Embodiment of Link Quality Metrics Generation

In one embodiment, the STA 104 generates link quality metrics for each subcarrier signal. In one embodiment, effective channel estimates are used to compute $$\hat{S}_{k,i} = A_{k,i} \hat{H}_{k,i}$$

where $\hat{S}_{k,i}$ is a quantity used to compute the link quality metrics below. In one embodiment, $A_{k,i}$ is an implementation-dependent matrix of order $N_{STS,i} \times N_{RX,i}$, resulting in a matrix $\hat{S}_{k,i}$ that is of order $N_{STS,i} \times N_{STS}$. The matrix $A_{k,i}$ may be determined by the STA i based on certain optimality criteria. In one embodiment, $\hat{H}_{k,i}$ is the effective channel, which is estimated using VHT-LTFs of an MU-MIMO packet.

In one embodiment, with regard to the matrix $A_{k,i}$, during the sounding phase, the STA 104 may select a subset of $N_{STS,i}$ receive antennas out of an available $N_{RX,i}$ antennas for each subcarrier. The selection may be represented by a matrix multiplication operation on $\hat{H}_{k,i}$. In such cases, $A_{k,i}$ may be a row selection matrix where each row of $A_{k,i}$ has a single non-zero element set to 1 in the column corresponding to the row of $\hat{H}_{k,i}$ which is selected. These selection matrices that are derived during the sounding phase may be stored and used while receiving a MU-MIMO downlink (DL) packet and deriving the MLQ metrics.

Alternatively, in one embodiment, the STA 104 may use channel information from the sounding phase and may derive orthonormal matrices $U_{k,i}$ by obtaining the singular value decomposition of $H_{k,i}$ (e.g., $H_{k,i} = U_{k,i} S_{k,i} V_{k,i}'$). While receiving an MU-MIMO DL packet, there may be some gain/phase mismatch. As such, the STA 104 may set $A_{k,i}=U_{k,i}'B_{k,i}$, where $B_{k,i}$ is a diagonal matrix which provides for gain/phase compensation.

In one embodiment, the STA 104 generates link quality metrics for each subcarrier signal metric based on the following equation:

$$MLQ_{k,i}(n) = 10\log_{10}\left(\frac{\sum_{p\in STS(i)}|\hat{S}_{k,i}(n,p)|^2}{\sum_{p\notin STS(i)}|\hat{S}_{k,i}(n,p)|^2}\right)$$

where $MLQ_{k,i}$ is an MU-MIMO link quality metric for a subcarrier k, $N_{STS,i}$ is a number of receiver antennas, and $\hat{S}_{k,i}(n,p)$ is a signal strength element in nth row and pth column of the matrix $\hat{S}_{k,i}$. Here STS(i) is the set of indices of space-time streams assigned to STA i.

In one embodiment, n is a space-time stream index and takes values 1, 2, ..., $N_{STS,i}$. The numerator may be interpreted as a sum of desired signal strengths while the denominator is a sum of interferer signal strengths. In one embodiment, the sum of desired signal strengths is derived (e.g., estimated) based on the received signals. Thus, the link quality metrics are primarily indicative of a signal-to-interference ratio in the log scale. In addition, the link quality metrics are also indicative of any changes in the channel and inefficacies in the derivation of the steering vectors. The link quality metrics are also affected by the choice of matrices $A_{k,i}$, which represents the receiver's strategy in dealing with interference. Thus, the link quality metrics provide a useful measure of the quality of the MU transmission as received by the STA 104.

Second Embodiment of Link Quality Metrics Generation

In one embodiment, the STA 104 generates the link quality metrics for an average of subcarriers. In one embodiment, the STA 104 generates the link quality metrics for an average of all subcarriers. Such link quality metrics result in a smaller feedback packet to the AP 102 than feedback packets using the per-subcarrier embodiment described above.

In one embodiment, the STA 104 generates link quality metrics for an average of subcarriers based on the following equation:

$$MLQ_{k,i}(n) = 10\log_{10}\left(\frac{\sum_{k=1}^{N_{sc}}\sum_{p\in STS(i)}|\hat{S}_{k,i}(n,p)|^2}{\sum_{k=1}^{N_{sc}}\sum_{p\notin STS(i)}|\hat{S}_{k,i}(n,p)|^2}\right)$$

where $MLQ_i$ is an MU-MIMO link quality for user i obtained by averaging signal strengths over all subcarriers, $N_{STS,i}$ is a number of receiver antennas, and $\hat{S}_{k,i}(n,p)$ is a signal strength element in nth row and pth column of the matrix $\hat{S}_{k,i}$. Here STS(i) is the set of indices of space-time streams assigned to STA i.

In one embodiment, similar to the per-carrier metrics described above, n is a space-time stream index and takes values 1, 2, ..., $N_{STS,i}$. The numerator may be interpreted as a sum of desired signal strengths while the denominator is a sum of interferer signal strengths. In one embodiment, the sum of desired signal strengths are derived (e.g., estimated) based on the received signals. Thus, the link quality metrics are primarily indicative of signal-to-interference ratio in the log scale. In addition, the link quality metrics are also indicative of any changes in the channel and inefficacies in the derivation of the steering vectors. The link quality metrics are also affected by the choice of matrices $A_{k,i}$ which represents the receiver's strategy in dealing with interference. Thus, the link quality metrics provide a useful measure of the quality of the MU transmission as received by the STA 104.

With regard to properties of the MLQ metrics, the MLQ metrics provide a measure of the effectiveness of the steering matrix used in a MU-MIMO DL transmission and any changes in the channel. In one embodiment, a matrix A may be chosen such that the metric is a true indicator of signal to residual-interference ratio (SIR).

In one embodiment, for reporting purposes, the STA 104 may limit $MLQ_i(n)$ to a pre-determined range and quantize $MLQ_i(n)$ to a fixed number of bits. In one embodiment, $MLQ_i(n)$ may be limited to a predetermined range (e.g., [−20,43] dB) and quantized to a predetermined number of bits (e.g., 6 bits). The resulting bits may be reported with acknowledgement (ACK) data in a new frame format called ACK+MLQ. This enables fast link adaptation, where the AP 102 can quickly determine the transmission quality and make changes to subsequent multi-user packet transmissions. In one embodiment, $MLQ_{ki}(n)$ may be quantized along the lines of $SNR_{ki}$ in an MU exclusive beamforming report. Further embodiments of MLQ metrics transmissions are described in detail below.

Transmission of Link Quality Metrics to the Access Point

Referring still to FIG. 3, after generating link quality metrics, the STA 104 transmits the link quality metrics to the AP 102, via step 310. In one embodiment, the STA 104 transmits the link quality metrics to the AP 102 in one or more acknowledgement packets.

In one embodiment, the link quality metrics may be reported by the STA 104 to the AP 102 using different methods based on whether the link quality metrics are per-subcarrier link quality metrics or average subcarrier link quality metrics. For example, in one embodiment, the link quality metrics may be computed and sent to the AP 102 during normal MU data operation. In one embodiment, the STA 104 may send a VHT MLQ frame containing $MLQ_{ki}(n)$ for n=1, 2, ..., $N_{STS,i}$ to the AP 102.

In one embodiment, for per-carrier link quality metrics, $MLQ_{k,i}(n)$ may be reported during a MU-MIMO downlink evaluation phase. To facilitate reporting, each quantity $MLQ_{k,i}(n)$ may be limited to a given range and quantized to a fixed number of bits.

To facilitate reporting, an average over all subcarriers may be computed, and the average and variations with respect to the average, given by (delta $MLQ_{k,i}(n)$), may be quantized and reported by the STA 104 to the AP 102. In one embodiment, delta $MLQ_{k,i}(n)=MLQ_{k,i}(n)-avg_k(MLQ_{k,i}(n))$, k=1, 2, ..., $N_{SC}$, n=1, 2, ..., $N_{STS,i}$.

In one embodiment, for average carrier metrics, $MLQ_{k,i}(n)$ may be reported in one or more acknowledgment packets for fast link adaptation. In one embodiment, the metric $MLQ_i(n)$ may be reported along with an acknowledgement packet using a new frame format called ACK+MLQ.

Figure 4:
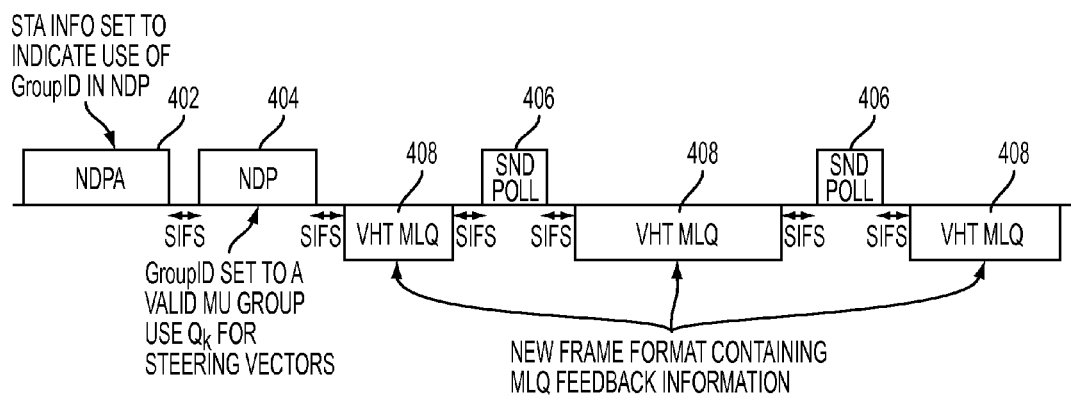
FIG. 4 is a diagram illustrating an evaluation protocol for reporting multi-user multiple-input and multiple-output link quality (MLQ) metrics to an AP in accordance with an embodiment of the present invention.

FIG. 4 is a diagram illustrating an evaluation protocol for reporting multi-user multiple-input and multiple-output link quality metrics (MLQ) metrics to an AP in accordance with an embodiment of the present invention. FIG. 4 shows a null data packet announcement (NDPA) packet 402, a null data packet (NDP) packet 404, sounding packet poll (SND Poll) packets 406, VHT MLQ packets 408, and short interframe spaces (SIFS). In one embodiment, the NDPA packet 402 includes an STA information set that indicates use of a group ID, and the NDP packet 404 includes a group ID set that is sent to a valid MU group. In one embodiment, the VHT MLQ packets 408 provide a frame format containing MLQ feedback information (e.g., link quality metrics).

In one embodiment, an MU-MIMO DL evaluation protocol may be used to facilitate reporting of link quality metrics by each STA 104 in the group addressed by a MU transmission. In various embodiments, the protocol may be similar to the sounding process used to enable reporting of channel information by the STAs 104.

Evaluation Phase at the Access Point

As indicated above, referring again to steps 206 and 208 of FIG. 2, the AP 102 uses the received link quality metrics to form groups of STAs 104 to which the AP 102 can transmit packets to the groups of STAs 104. The AP 102 also uses the link quality metrics to derive steering vectors to be used for each group of STAs 104, where the steering vectors reduce interference during multi-user transmissions.

In one embodiment, the evaluation phase may be initiated by the AP 102 transmitting NDPA and NDP frames. Certain fields in the NDPA and NDP frames may be set appropriately to indicate that the transmission is a multi-user frame and the NDP frame may be transmitted using the steering vectors derived by the AP 102. In one embodiment, the frame VHT-MLQ which holds the quantized $avg_k(MLQ_{k,i}(n))$ and the delta $MLQ_{k,i}(n)$ is transmitted by the STA 104.

In one embodiment, when forming groups of STAs 104, the AP 102 may regroup the STAs based on the link quality metrics for more improved transmissions and reduced overhead. In one embodiment, the AP 102 may use similar processes to sounding processes using NDP. In one embodiment, the AP 102 may apply the steering matrix Q derived from earlier sounding process on the VHT fields. In one embodiment, the AP 102 may indicate the use of a group ID using an NDPA and STA information field set. In one embodiment, the AP 102 may use NDP with a group ID in a VHT-SIG-A set to indicate a valid MU group. In one embodiment, the MLQ metrics may be extended (e.g., to MU-FLA: MU-MRQ, MU-MFG, etc.). In one embodiment, the AP 102 may provide opt-out mechanisms (e.g., for MU-STA, MU-MFB=0, etc.).

In one embodiment, the steering vectors that the AP 102 derives optimize transmission to the STAs 104. The original vectors derived by the AP might not be as optimal and may lead to interference, which can lead to packet loss. The newly derived steering vectors minimize such interference and thus minimize packet loss.

Embodiments disclosed herein provide numerous benefits. For example, implementations of the embodiments described herein provide metrics that directly measure interference. Embodiments also provide the metrics for use by an access point to derive steering vectors, which cause less interference during a multi-use transmission. Embodiments also facilitate MU grouping processes by minimizing trial-and-error and maximizing confidence in MU transmissions. Embodiments also provide an AP with valuable information such as the staleness of profiles/precoding matrices, and level of interference mitigation at STA. Embodiments also allow for per-STA transmission power adjustment to minimize interference. For example, if an STA is close to the AP, the AP may reduce the transmission power in order to reduce interference. Embodiments also assist in link adaptation.

A method and system for improving multi-user downlink reception quality in WLANS have been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method comprising:
receiving, at a plurality of stations, at least one multi-user sounding packet from an access point;
determining a sum of desired signal strengths from the at least one received multi-user sounding packet by each of the plurality of stations;
determining a sum of interference signal strengths from the at least one received multi-user sounding packet by each of the plurality of stations; and
generating multi-user multiple-input and multiple-output link quality metrics based on a ratio of the sum of desired signal strengths to the sum of interference signal strengths,
wherein the generating of the link quality metrics is based on the following equation:

$$MLQ_{k,i}(n) = 10\log_{10}\left(\frac{\sum_{p \in STS(i)} |\hat{S}_{k,i}(n,p)|^2}{\sum_{p \notin STS(i)} |\hat{S}_{k,i}(n,p)|^2}\right)$$

wherein $MLQ_{k,i}$ is a multi-user (MU) multiple-input and multiple-output (MIMO) link quality for a subcarrier k, $N_{STS,i}$ is a number of receiver antennas, and wherein $\hat{S}$ is a signal strength.

2. The method of claim 1, further comprising transmitting the link quality metrics to the access point.

3. The method of claim 1, further comprising transmitting the link quality metrics to the access point in at least one acknowledgement packet.

4. The method of claim 1, wherein the generating of the link quality metrics is performed for each subcarrier signal.

5. The method of claim 1, wherein the generating of the link quality metrics is performed for an average of subcarriers.

6. A method comprising:
receiving, at a plurality of stations, at least one multi-user sounding packet from an access point;
determining a sum of desired signal strengths from the at least one received multi-user sounding packet by each of the plurality of stations;
determining a sum of interference signal strengths from the at least one received multi-user sounding packet by each of the plurality of stations; and
generating multi-user multiple-input and multiple-output link quality metrics based on a ratio of the sum of desired signal strengths to the sum of interference signal strengths,
wherein the generating of the link quality metrics is based on the following equation:

$$MLQ_i(n) = 10\log_{10}\left(\frac{\sum_{k=1}^{N_{SC}}\sum_{p\in STS(i)}|\hat{S}_{k,i}(n,p)|^2}{\sum_{k=1}^{N_{SC}}\sum_{p\notin STS(i)}|\hat{S}_{k,i}(n,p)|^2}\right)$$

wherein $MLQ_i$ is a multi-user (MU) multiple-input and multiple-output (MIMO) link quality for user i, $N_{STS,i}$ is a number of receiver antennas, and wherein $\hat{S}$ is a signal strength.

7. A method comprising:
transmitting, from an access point, at least one multi-user sounding packet to each station of a plurality of stations; and
receiving multi-user multiple-input and multiple-output link quality metrics from each of the stations, wherein the multi-user multiple-input and multiple-output link quality metrics are based on a ratio of a sum of desired signal strengths to a sum of interference signal strengths,
wherein the link quality metrics are generated based on the following equation:

$$MLQ_{k,i}(n) = 10\log_{10}\left(\frac{\sum_{p\in STS(i)}|\hat{S}_{k,i}(n,p)|^2}{\sum_{p\notin STS(i)}|\hat{S}_{k,i}(n,p)|^2}\right)$$

wherein $MLQ_{k,i}$ is a multi-user (MU) multiple-input and multiple-output (MIMO) link quality for a subcarrier k, $N_{STS,i}$ is a number of receiver antennas, and wherein $\hat{S}$ is a signal strength.

8. The method of claim 7, further comprising:
forming a group of stations; and
generating steering vectors for simultaneous multi-user transmission to the group of stations.

9. The method of claim 7, wherein the link quality metrics are received in at least one acknowledgement packet.

10. The method of claim 7, wherein the link quality metrics are generated for each subcarrier signal.

11. The method of claim 7, wherein the link quality metrics are generated based on an average of subcarrier signals.

12. A method comprising:
transmitting, from an access point, at least one multi-user sounding packet to each station of a plurality of stations; and
receiving multi-user multiple-input and multiple-output link quality metrics from each of the stations, wherein the multi-user multiple-input and multiple-output link quality metrics are based on a ratio of a sum of desired signal strengths to a sum of interference signal strengths,
wherein the link quality metrics are generated based on the following equation:

$$MLQ_i(n) = 10\log_{10}\left(\frac{\sum_{k=1}^{N_{SC}}\sum_{p\in STS(i)}|\hat{S}_{k,i}(n,p)|^2}{\sum_{k=1}^{N_{SC}}\sum_{p\notin STS(i)}|\hat{S}_{k,i}(n,p)|^2}\right)$$

wherein $MLQ_i$ is a multi-user (MU) multiple-input and multiple-output (MIMO) link quality for user i, $N_{STS,i}$ is a number of receiver antennas, and wherein $\hat{S}$ is a signal strength.

13. An system comprising:
a processor; and
a storage device storing one or more stored sequences of instructions which when executed by the processor cause the processor to:
transmit, from a transmission device, a plurality of multi-user sounding packets to a plurality of stations; and
receive multi-user multiple-input and multiple-output link quality metrics from each of the stations, wherein the multi-user multiple-input and multiple-output link quality metrics are based on a ratio of a sum of desired signal strengths to a sum of interference signal strengths,
wherein the link quality metrics are generated based on the following equation:

$$MLQ_{k,i}(n) = 10\log_{10}\left(\frac{\sum_{p\in STS(i)}|\hat{S}_{k,i}(n,p)|^2}{\sum_{p\notin STS(i)}|\hat{S}_{k,i}(n,p)|^2}\right)$$

wherein $MLQ_{k,i}$ is a multi-user (MU) multiple-input and multiple-output (MIMO) link quality for a subcarrier k, $N_{STS,i}$ is a number of receiver antennas, and wherein $\hat{S}$ is a signal strength.

14. The system of claim 13, wherein the instructions further cause the processor to:
form a group of stations; and
generate steering vectors for simultaneous multi-user transmission to the group of stations.

15. The system of claim 13, wherein the link quality metrics are received in at least one acknowledgement packet.

16. The system of claim 13, wherein the link quality metrics are generated for each subcarrier signal.

17. The system of claim 13, wherein the link quality metrics are generated based on an average of subcarrier signals.

* * * * *